Aug. 13, 1940. W. E. PARKES 2,211,025
BRAKING MECHANISM
Filed April 28, 1939 5 Sheets-Sheet 1
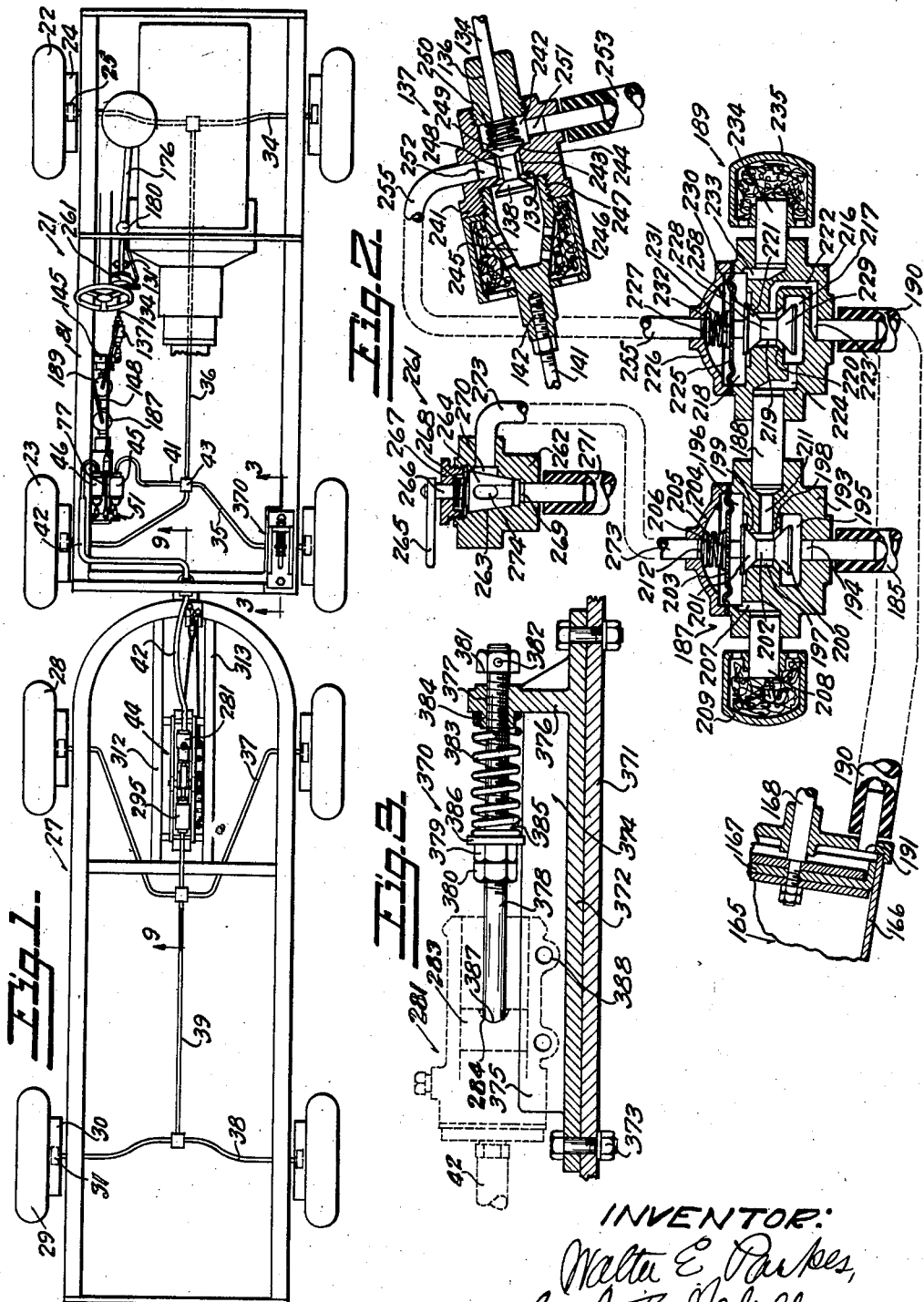
INVENTOR:
Walter E. Parkes,
by [signature]
His Attorney.

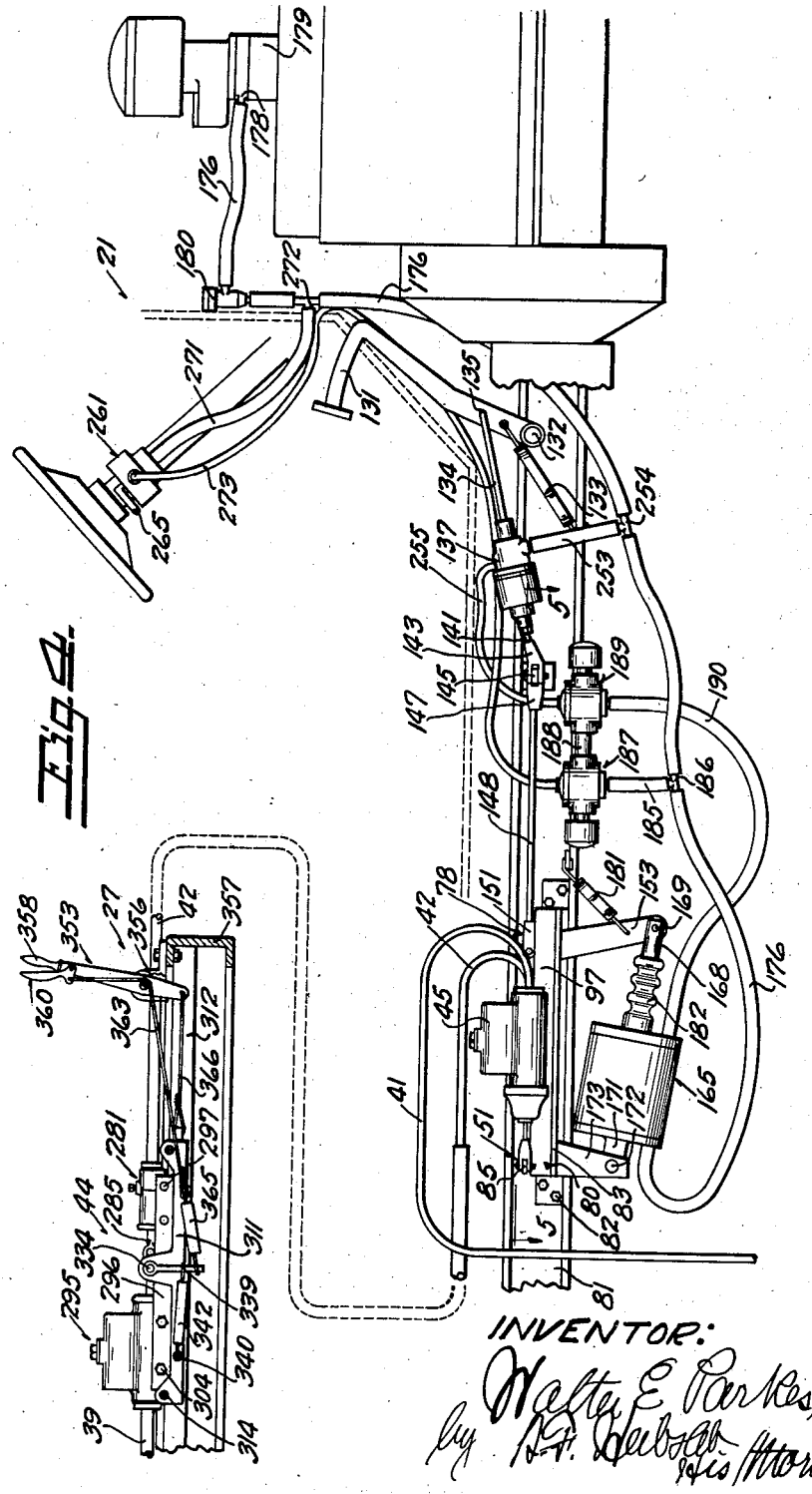

Aug. 13, 1940.   W. E. PARKES   2,211,025
BRAKING MECHANISM
Filed April 28, 1939   5 Sheets-Sheet 3
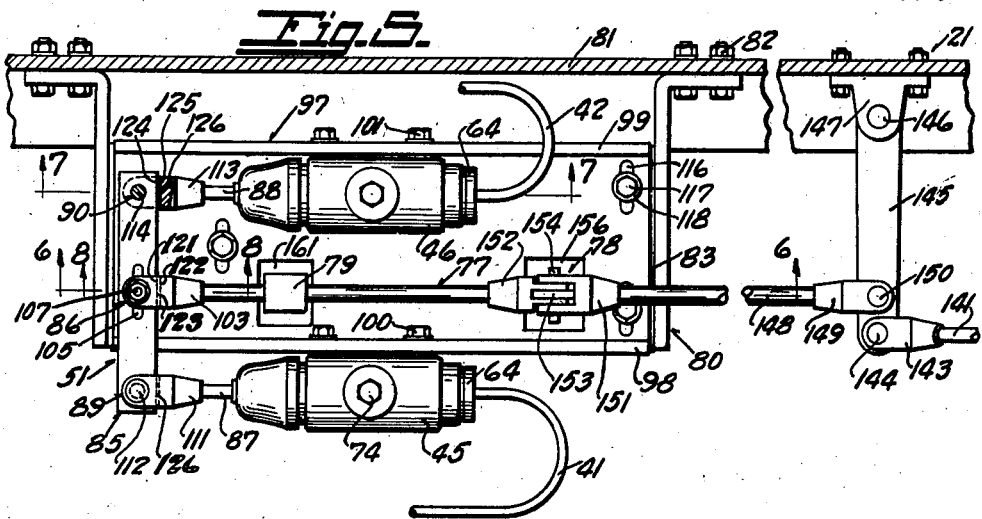
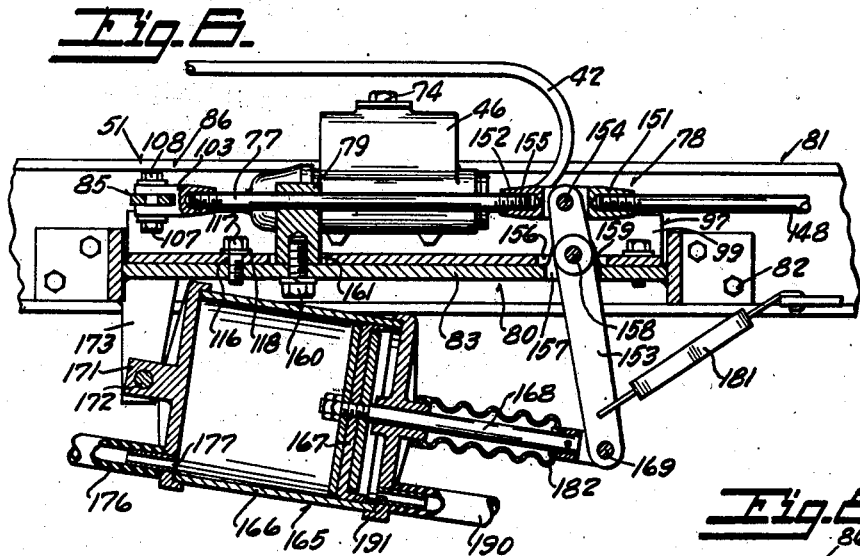
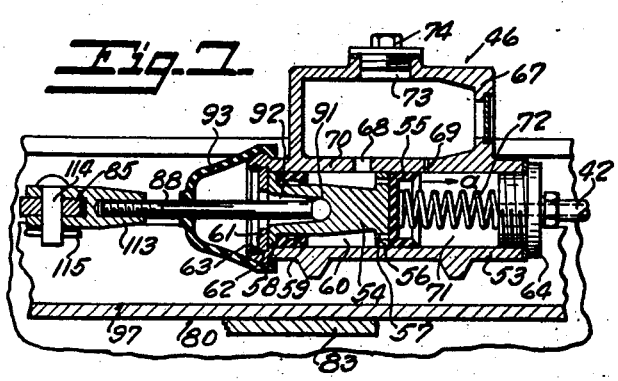
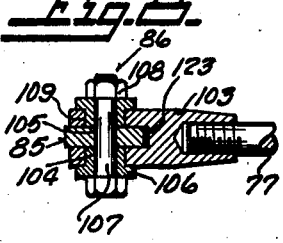
INVENTOR:
Walter E. Parkes,

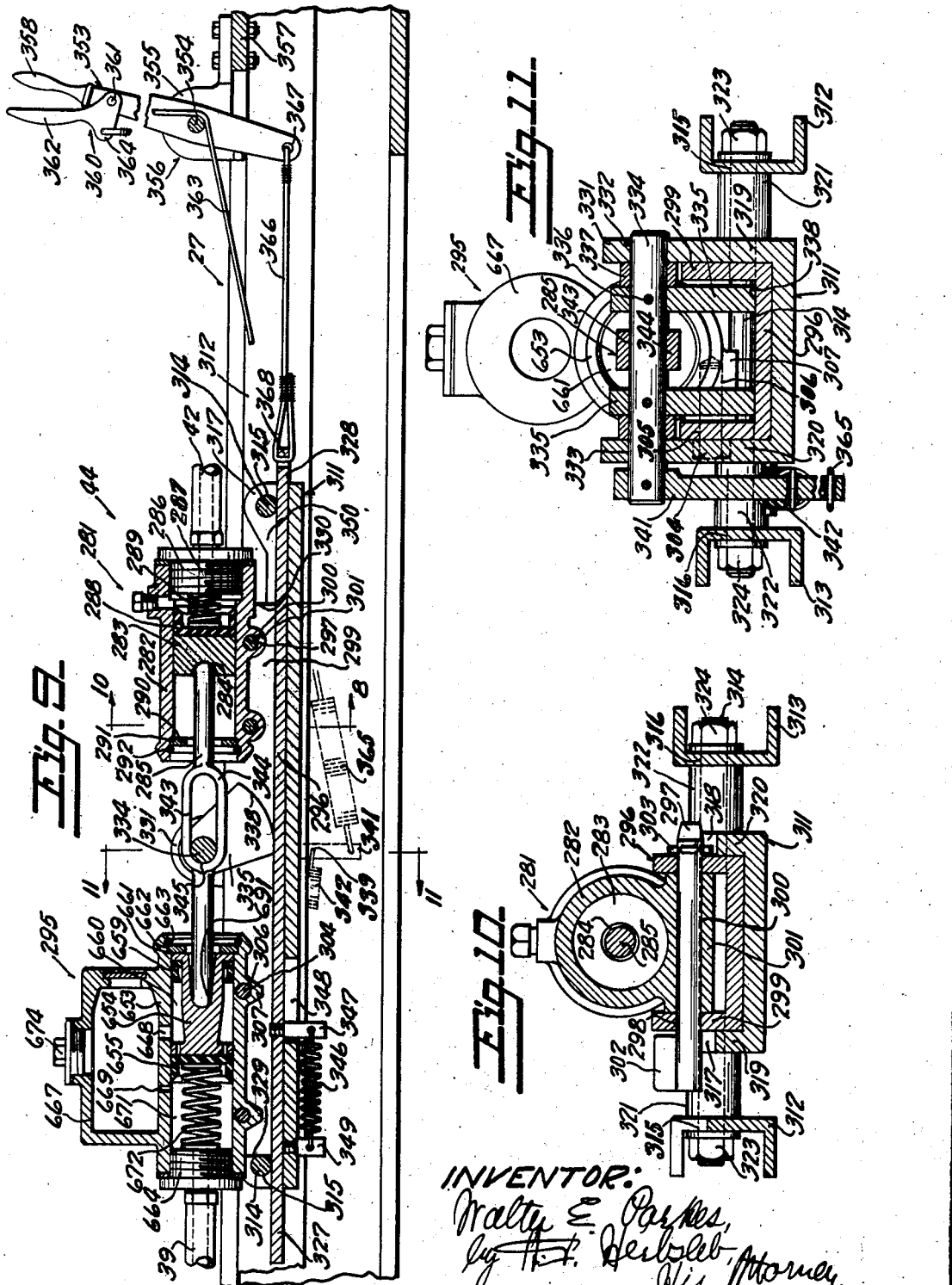

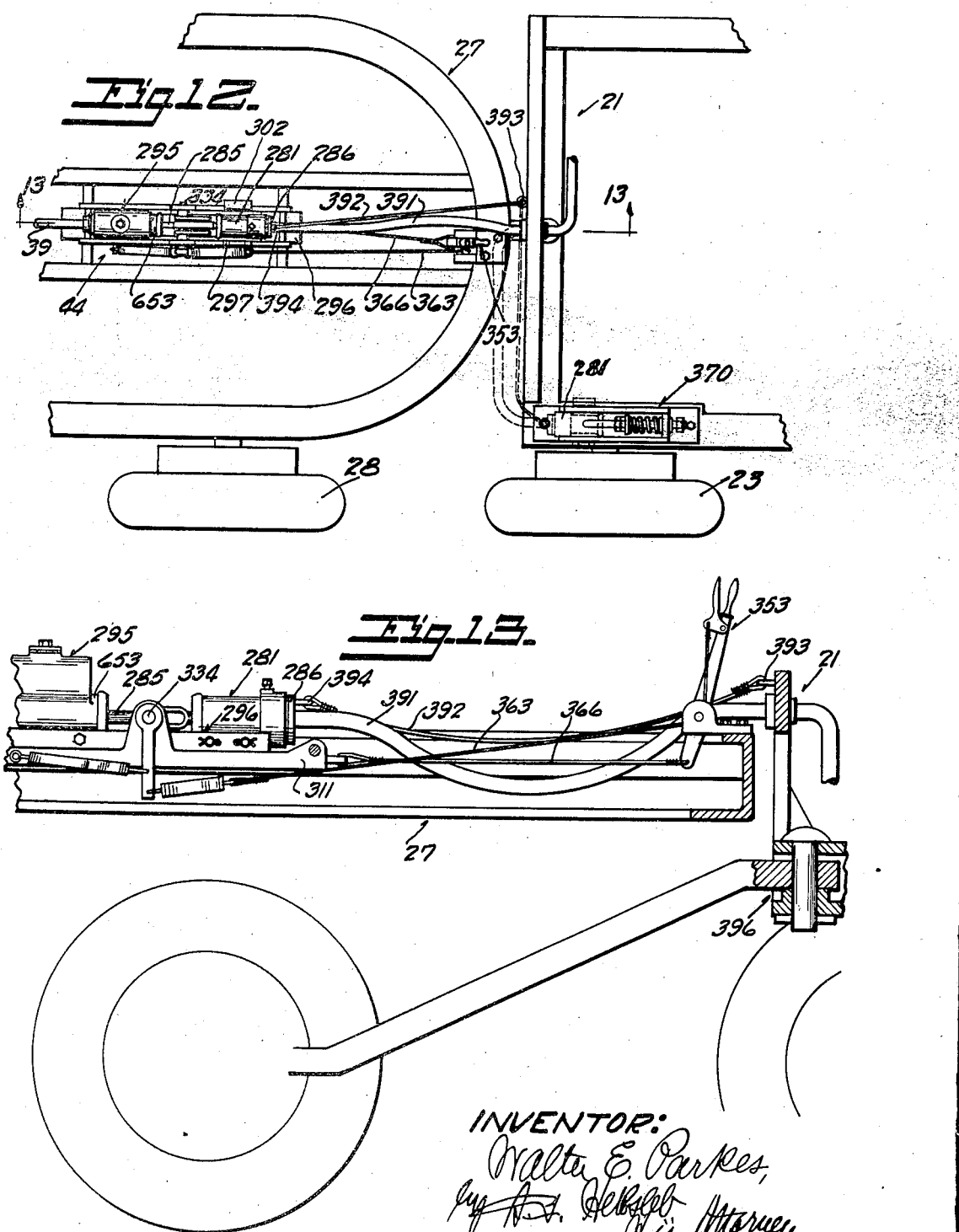

Patented Aug. 13, 1940

2,211,025

UNITED STATES PATENT OFFICE 2,211,025

BRAKING MECHANISM

Walter E. Parkes, Norwood, Ohio

Application April 28, 1939, Serial No. 270,535

30 Claims. (Cl. 188—3)

My invention relates to braking mechanism on vehicles. It is the object of my invention to provide new and improved means whereby to brake a plurality of wheels or the wheels on connected vehicles by independent braking mechanisms and a novel associator therebetween for actuating the same; further, to provide adjusting means for the associator so that the power application upon the independent braking mechanisms may be adjusted, for instance, to relate or equalize their braking effects, whereby, for instance, trailers or towed vehicles whose brakes have different brake capacities or actuators may be substituted for each other for connection with a given tractor or towing vehicle, or tractors or towing vehicles, and trailers or towed vehicles may be readily interchanged, and the braking mechanisms on connected vehicles be readily equalized or related; and, further, to provide novel operating means for the braking mechanism.

It is the object of my invention, further, to provide novel connecting means in braking mechanism to connect parts of the braking mechanism located on different trackless vehicles; further, to provide novel means for counteracting the detrimental results which would otherwise be present upon a breakaway of a trailer or towed vehicle from a tractor or towing vehicle, whereby upon such breakaway the brakes upon the trailer or towed vehicle are automatically applied; further, to provide novel means whereby such application of brakes upon a breakaway is maintained; further, to provide novel control means for the latter; further, to provide novel means for disconnecting parts of braking mechanism respectively on normally connected trackless vehicles in novel manner whereby separation between the vehicles may take place and the connecting parts of braking mechanism on the respective vehicles may be re-arranged on the respective vehicles; further, to arrange such connecting parts for independent brake application upon the respective vehicles; further, to provide novel means between the brake mechanisms on connected vehicles for producing braking effects for simultaneous stopping of the respective vehicles regardless of their respective weights; and, further, to provide novel means for adjusting the latter.

My invention consists in providing novel means for accomplishing the respective objects stated; and my invention will be further readily understood from the following description and claims, and from the drawings, in which latter:

Fig. 1 is a plan view of my improved braking mechanism in associated relation respectively on a tractor, truck or propelling vehicle, hereinafter also referred to as a towing vehicle, and a propelled vehicle or trailer, hereinafter, also referred to as a towed vehicle, partly diagrammatic, with parts of the vehicles removed and parts broken away. The vehicles are shown as trackless vehicles.

Fig. 2 is a diagrammatic representation of a hand valve, a control valve, relay valves and a power actuator in associated relations, and partly broken away, the valves being shown in axial section, and the conduit connections being shown partly in dotted lines, the power actuator being also known as a power cylinder or booster cylinder.

Fig. 3 is a vertical section, taken on the line 3—3 of Fig. 1, and partly broken away, showing a compensating fixture, to which an actuating part of the brake mechanism for the towed vehicle (shown in dotted lines), is arranged to be applied when the towed vehicle is intentionally disconnected from the towing vehicle.

Fig. 4 is a diagrammatic representation of my improved braking mechanism, partly broken away, and partly shown in dotted lines.

Fig. 5 is a plan view of the associating mechanism for associating a plurality of brake mechanisms, the frame of the vehicle being shown in section on the line 5—5 of Fig. 4, and partly broken away.

Fig. 6 is a vertical section of the same and of the associated power actuator, taken on the line 6—6 of Fig. 5, and partly broken away.

Fig. 7 is an axial section of one of the fluid operating units, also known as a master cylinder, taken on the line 7—7 of Fig. 5, and partly broken away.

Fig. 8 is a cross section of a detail of the associating mechanism, taken on the line 8—8 of Fig. 5, and partly broken away.

Fig. 9 is a vertical section of the breakaway mechanism, taken on the line 9—9 of Fig. 1, and partly broken away.

Figs. 10 and 11 are cross sections of the latter, taken respectively in the planes of the lines 10—10 and 11—11 of Fig. 9.

Fig. 12 is a plan view showing a modification of the connecting means between a towing vehicle and a towed vehicle, partly broken away, and showing the actuating means for the brake mechanism on the towed vehicle mounted on the towed vehicle in full lines, and mounted on the towing vehicle in association with the compensating fixture in dotted lines; and, Fig. 13 is a vertical section of the same, taken on the line 13—13 of Fig. 12, and partly broken away.

A towing vehicle 21 comprises front wheels 22 and rear wheels 23 respectively provided with brakes 24, having usual brake cylinders 25 respectively arranged to be actuated by suitable fluid for applying the brakes (Fig. 1). A towed vehicle 27 is connected with the towing vehicle and has wheels 28, 29, provided with brakes 30, respectively having brake cylinders 31 for applying the brakes. The braking mechanisms respectively on the towing vehicle and on the towed vehicle are each self-contained to permit independent brake application on each of said vehicles. Conduits 34, 35 connect with the respective brake cylinders 25 of the brakes for the front wheels and the rear wheels of the towing vehicle, and are interconnected by a conduit 36. Conduits 37, 38 connect with the respective brake cylinders on the towed vehicle and have a conduit 39 connected therewith.

Conduits 41, 42 connect respectively with the conduits on the towing vehicle and the towed vehicle, the former by a connection 43, and the latter by a breakaway mechanism 44, hereinafter described (Figs. 1, 4 and 5). These conduits form fluid passages for suitable brake actuation, and in the present exemplification contain a suitable braking liquid, such as oil and other ingredients well known in the art, to which pressure is applied for applying the brakes, relief of pressure thereon releasing the brakes. Fluid operating units 45, 46, such as so-called master cylinders or pressure cylinders, connect with the respective conduits 41, 42, and have an associator 51 coacting therewith for brake actuation and release of the brakes on the towing vehicle and on the towed vehicle.

Each of the fluid operating units or master cylinders 45, 46, (Fig. 7) preferably comprises a pressure cylinder 53, in which there is a piston 54 provided with a flexible cup washer 55 at its inner end, bearing against a flange 56 of the piston provided with apertures 57, closed by said washer when the piston moves inwardly for applying pressure and allowing passage of the pressure liquid therethrough when the piston moves outwardly for release of the brakes.

The outer end of the piston has a radially extending flange 58, limiting outward movement of an annular packing ring 59, between which and an annular flange 56 at the inner end of the piston there is a space 60. A limiting flange 61 releasably held in an annular rabbet 62 in the outer end of the cylinder by a spring ring 63, retains the piston in the cylinder. The other end of the cylinder is provided with a plug 64, threaded into said other end, the conduit 42 being operatively connected with said plug for communicating with said cylinder. A reservoir 67 is located above the cylinder, there being holes 68, 69 in the wall 70 between said reservoir and the cylinder, the hole 68 communicating with the space 60, and the hole 69 communicating with the space 71 in said cylinder between its piston and the plug 64. A spring 72 between said plug and the piston normally retracts the piston and holds the washer to the piston. The reservoir has a filler opening 73 in which a closing plug 74 is threaded.

The cylinder 53 is normally filled with the pressure applying liquid, which readily passes to and from the reservoir through the holes 68, 69 during the initial portion of the brake applying movement of the piston in the direction of the arrow a, and maintains the braking mechanism communicating therewith in operative condition without supply of fluid or fluid connection with an outside source, and making each braking system self-contained. The hole 69 is covered by the cup washer 55, thereby preventing return flow of the liquid to the reservoir during advancing movement of the piston for applying pressure to the liquid in the cylinder in advance of the piston, the conduits connected therewith, and the brake cylinders on the vehicle to apply the brakes. When the brake applying force is released the piston is retracted, aided by the action of the spring 72 for releasing the brakes.

It is important in a liquid pressure or hydraulic system of this character that the liquid be kept free of air and other gases which are compressible and would prevent the transmission of pressure from the pressure cylinder to the brake cylinder and result in consequent brake failure. The reservoir and passages between it and the pressure cylinder insure that the pressure cylinder shall always be properly filled with the pressure liquid and permit retraction of excess liquid there may be in the cylinder.

One of the fluid operating units is provided for the brake mechanism on the towing vehicle and one of the same is provided for the brake mechanism on the towed vehicle, and the associator 51 is provided for combined operations of these fluid operating units so as to impart brake application simultaneously to the respective brake mechanisms for similar and simultaneous operations of the brakes on both the vehicles in order that each vehicle may be independently stopped without undue pressure or dragging between the vehicles.

The associator exemplified (Figs. 4, 5, 6, 7 and 8) comprises an operating rod 77 having a joint 78 therein and reciprocable in a bearing 79 on a support 80, shown as a bracket secured to the frame or chassis 81 of the vehicle by bolts and nuts 82, and comprising a shelf 83. A cross bar 85, which may be termed an equalizer bar, has pivot connection 86 with the operating rod 77. Piston rods 87, 88 have pivot connections 89, 90 with the cross bar. The inner ends of each of these piston rods is seated in a seat 91 at the bottom of a socket 92 extending inwardly into the piston and flaring outwardly toward its mouth to accommodate tilting movements of the piston rod. A shield 93 is received over the outer end of the cylinder and is provided with a central hole in which the piston rod is located, the shield being, for instance, of rubber, and making close connections with the piston rod and the cylinder for shielding the mechanism therein from exterior dust, dirt and moisture.

The fluid operating units are normally located at the respective sides of the operating rod and parallel therewith and equidistant therefrom. Assuming that the cylinders of the fluid operating units are of equal diameters for brake application, this relation is normally satisfactory where the braking mechanism on the towing vehicle and the braking mechanism on the towed vehicle are of substantially equal capacities gaged by the respective weights of the towing and towed vehicles, for equal brake application on both. I have found in practice, however, that it is desirable to connect various towed vehicles selectively with given towing vehicles and to interchange various towed vehicles with various towing vehicles in order that towed vehicles may be loaded when disconnected from towing vehicles, and any towing vehicle available may be connected with any loaded towed vehicle in order to prevent idleness of the towing vehicles or towed vehicles and to obtain the greatest mileage for the respective towing and towed vehicles for greatest economy in the carrying equipment and for steadiness of employment of the drivers and attendants. The towing vehicle may be engine equipped or be one of a train of vehicles followed by another vehicle in the train.

The braking capacity of various towing vehicles and the various towed vehicles varies so that it may be desirable for efficiency to connect a towing vehicle having one braking capacity with a towed vehicle having another braking capacity, which may be either greater or less than the braking capacity of the towing vehicle. I provide means therefore for properly equalizing or relating the associator between the fluid operating units for the respective braking mechanisms of the towing vehicle and the towed vehicle in order to compensate for this varying condition between such braking mechanisms. An adjustment is provided between the operating rod and the fluid operating units whereby to apply a greater operating pressure to one than to the other to compensate for the varying braking capacities of the respective braking mechanisms, and this adjustment is exemplified as an adjustment of the lengths of the respective portions or arms of the cross bar between the operating rod and the respective fluid operating units. The fluid operating units are shown in fixed relation to each other, being rigidly secured to a support 97, shown as a channel piece, the cylinders of the fluid operating units being fixed to the flanges 98, 99 of the channel piece by bolts 100, 101.

The operating rod is provided with a fork 103, the tines of which are located at the respective sides of the cross bar, and are pivoted on sleeves 104 at the respective sides of the cross bar. The proximate ends of the sleeves impinge upon the respective sides of the walls of a slot 105 in the cross bar, the outer ends of the sleeves being provided with flanges 106, and the sleeves and cross bar being clamped together by means of a bolt 107 having its head at one end of the assembly and a nut 108 threaded over the bolt at the other end of the assembly. This assembly readily tilts in the pivot holes 109 in the tines of the fork 103 in which the sleeves form pivots for pivoting the cross bar at any point in the length of the slot, constituting the respective ends or arms of the cross bar of varying lengths at the respective sides of its pivot. The piston rod 87 is provided with a fork 111, the tines of which are located at the respective sides of the cross bar and connected therewith by a pivot pin 112. The piston rod 88 is provided with a fork 113, the tines of which are located at the respective sides of the cross bar and connected therewith by a pivot pin 114. Cotter pins 115 hold the pivot pins in place.

The channel piece 97, (Figs. 4, 5 and 6), to which the fluid operating units are secured, is adjustable laterally with relation to the operating rod and the bearing in which it is located to accommodate for any adjustment between the cross bar 85 and the operating rod, being adjustable on its supporting bracket, as by providing the channel piece with cross slots 116, through which clamp bolts 117 pass, the clamp bolts being threaded into the bracket, for clamping the channel piece in laterally adjusted positions, washers 118 being located between the heads of the bolts and said channel piece.

If adjustment be made so that there is unequal distance between the jointed connection of the operating rod with the cross bar and the respective jointed connections between the cross bar and the piston rods, unequal forces are applied to the respective piston rods for applying a greater or a less pressure to the braking mechanisms respectively for the towing vehicle and the towed vehicle to compensate for the varying capacities of the brakes respectively on the towing vehicle and the towed vehicle, to equalize the braking effect on the same, respectively.

The operating rod 77 may be manually operated or may be operated by power or selectively by both said means. I have preferred to so relate the parts that there shall be only limited relative movement between the pistons in the cylinders of the fluid operating units, as only limited relative movement is required between the same to compensate for the varying braking capacities on the different towed vehicles and different towing vehicles which may be associated. I employ such capacity for limited movement as a safety feature to avoid failure of brake actuation simultaneously in all of the brakes, such limited movement in the present exemplification being obtained by limiting the tilting movement between the cross bar and the actuating rod and selectively between the cross bar and the pistons, obtained by providing the cross bar and the actuating rod with shoulders 121, 122 normally spaced by a space 123, and the cross bar and the piston with shoulders 124, 125, normally spaced by a limiting space 126, permitting desired tilting movements of the cross bar on the actuating rod and with relation to the pistons for brake equalization, but preventing excess tilting movement of the cross bar on the operating rod to maintain active relation between the operating rod and the piston rods of the respective fluid operated units. This insures independent actuation of the piston rods in case of disarrangement or leakage in one of the braking mechanisms, toward which the cross bar would then tilt, limited by contact between the shoulders, so as to retain active connection with and apply braking force to the other braking mechanism, which is still in order. By these means brake application on either the towing vehicle or on the towed vehicle is assured even if the brake mechanism on the other is deranged, in order to insure stoppage of the connected vehicles.

Suitable means are provided for operating the operating rod. These means may be operated either manually or by power, and the power means may be either mechanical or may be fluid actuated by normally balanced controls, unbalanced for actuation by a lower pressure, for instance, vacuum, controlled or actuated by a higher pressure, for instance, atmosphere; or by a lower pressure, for instance, vacuum or atmosphere controlled or actuated by a higher pressure higher than atmosphere suitably obtained; or by suitable combinations of the same, suitably obtained; but I prefer to show such power actuation by means of vacuum created by the suction of an engine on the towing vehicle, controlled by atmosphere which is introduced for unbalancing the pressure at the respective sides of a piston.

I prefer to employ manually actuated means for unbalancing control, so arranged as to effect brake application in case of failure, wholly or partial, of the power actuating means. Thus a pedal lever 131 is pivoted to the frame 81 of the towing vehicle on a pivot 132, a spring 133 between the pedal and the frame normally retracting the pedal. (Figs. 1, 4, 5 and 6.)

A rod 134 has pivotal connection 135 with the pedal and has slide connection 136 with a control valve 137. The rod is arranged to move the control valve in applying the brakes. It has a valve 138 which serves as a stop, which coacts with a valve seat 139, which serves as a coacting stop, to move the control valve. A rod 141 is fixed to the casing of the control valve by a threaded connection 142, and is provided with a fork 143 having jointing connection 144 with a lever 145 pivoted by a pivot 146 in a fork 147 secured to the frame 81 of the towing vehicle in such manner as to hold the lever in horizontal position. A rod 148 has a fork 149 which has jointing connection 150 with said lever, and is provided with a fork 151 which has jointing connection with a fork 152 and a lever 153 by a pivot pin 154 in the tines of said forks and in said lever. The fork 152 is fixed to the operating rod 77 by threaded connection 155.

The lever 153 passes through an opening 156 in the channel piece 97 and a slot 157 in the shelf 83. It is pivoted by a pin 158 to bearing lugs 159 extending from said shelf and located in the opening 156. The operating rod 77 is slidable endwise in the bearing 79 extending from the shelf 83, as by being fixed thereto by a bolt 160, and extending through an opening 161 in the channel piece. The openings 156, 161 permit lateral adjustments of the channel piece on the shelf without disturbance of the operating rod or its mounting means, or disturbing axial alinement of the parts, when laterally adjusting the fluid operating units.

The power connection with the operating rod is obtained by means of a power actuator 165. The power actuator may be operated mechanically or by compressed air or other fluid. It is shown as a booster cylinder which comprises a cylinder 166 and a piston 167 therein, from which a piston rod 168 extends and has pivotal connection 169 with the lever 153. The cylinder of the power actuator is provided with a lug 171 in which there is a pivot pin 172, the pivot pin being also mounted in a forked bracket 173, depending from the shelf at one end of said shelf. The power actuator maintains its alinement in a vertical plane with its actuated parts upon adjustment of the channel piece 97.

The piston 167 is normally in retracted position. (Figs. 4 and 6.) In the present exemplification the actuating agent is vacuum, created by suction from the vehicle engine and exhausting air from the cylinder at one side of the piston through a conduit 176, which at one end has connection through a port 177 with the cylinder, and at its other end has connection through a port 178, with the intake 179 of the engine, there being a check valve 180 in this conduit to maintain the vacuum in the section of the conduit connecting with the power actuator. The piston in the power actuator is normally in balanced condition in its cylinder with vacuum at both sides thereof, being normally moved to one end of the cylinder by means of a spring 181 between the frame and the lever 153 for retracting the piston. A bellows shield 182 is normally located about the piston rod.

In order to create vacuum at the retracting side of the piston, air is drawn therefrom through a branch passage including a conduit 185 operatively connecting with the vacuum conduit 176 at 186, a relay valve 187, a pipe 188 between said relay valve and a second relay valve 189, and a conduit 190, one end of which has communication with the second relay valve at one end thereof, the other end thereof communicating with a port 191 at said side of the piston in the cylinder of the power actuator.

The relay valve 187 (Figs. 2 and 4) comprises a casing 193, in which there is an outlet port 194, a chamber 195, a chamber 196, between which chambers there is a passage 197, having valve seats 198, 199 at its respective ends, with which respectively valves 200, 201 of a two-way valve 202 coact. A diaphragm 203 is fixed between the casing and a head 204 thereof secured to the casing and clamping the diaphragm between it and the casing. The double acting valve 202 is secured to the diaphragm by a connection 205, and the diaphragm is normally urged to seat the valve 201 of the double acting valve by means of a spring 206 between the diaphragm and the casing head. A passage 207 in the casing communicates with the cavity 196 and connects with a pipe 208 communicating with the atmosphere through a cleaner 209, secured to said pipe. The casing further has a passage 211 therein, communicating with the passage 197 and with the pipe 188 connecting the casings of said relay valves. The cap 204 is provided with a port 212.

The relay valve 189 comprises a casing 216 in which there is a cavity 217 and a cavity 218 connected by a passage 219, and having valve seats 220, 221, at the respective ends of said passage. A passage 222 connects the passage 219 with a port 223 in said casing. A passage 224 connects the cavity 217 with the other end of the pipe 188. A diaphragm 225 closes the outer end of the cavity 218, the margin of the diaphragm being clamped between the casing and a cap 226 provided with a port 227. There is a double acting valve 228, comprising valves 229, 230, coacting with the respective seats 220, 221. The double acting valve is secured to the diaphragm by a connection 231. A spring 232 between the cap and the diaphragm acts on the diaphragm to normally close the valve 230. A passage 233 in the casing communicates with the cavity 218 and a pipe 234, which has an air cleaner 235 on its outer end.

Vacuum is normally created at the spring actuated side in the piston of the power actuator 165 (Figs. 2, 4 and 6), through the conduit 190, the port 223, the passage 222, the passage 219, the valve seat 220, normally open, the cavity 217, the passage 224 in the relay valve 189, the pipe 188, the passage 211, the passage 197, the valve seat 198, the cavity 195, the port 194, and the conduit 185 connecting with the conduit 176 leading to the intake manifold of the engine.

The control valve 137 includes a casing 241, in which there is a cavity 242, a passage 243 connecting therewith, and valve seats 244, 139 at the respective ends of the passage 243, arranged to communicate with said cavity 242 at one end thereof, the other end of said passage communicating with the cavity 245 of an air cleaner 246, the wall of this cavity being substantial and having threaded connection 247 with the casing at one end thereof, and the rod 141 having threaded connection 142 therewith at its other end. The rod 134 connects with the pedal at one end thereof and has the double acting valve 248 at its other end. The double acting valve comprises the valves 138, 249 and is normally retracted by a spring 250 between it and the bearing 136 for normally closing the valve seat 244. The casing is provided with a port 251 communicating with the cavity 242. The casing is also provided with a port 252 communicating with the passage 243. A conduit 253 communicates with the port 251 and with the vacuum conduit 176 at 254, and a conduit 255 communicates with the port 252 and with the port 227 of the relay valve 189.

The diaphragm 225 of the relay valve 189 is normally collapsed by having atmospheric pressure thereon through the port 227, (Figs. 2, 4 and 6), the conduit 255, the port 252, the passage 243, and through the valve seat 139 with the air cleaner 246. When the pedal 131 is actuated, pull is exerted on the rod 134 for closing the valve seat 139, and having the valve 138 act thereon as a pulling agent to move the control valve in the direction of pull and exerting pulling force upon the rods 141, 148, for manually actuating the operating rod 77 by its connections therewith. Normally, however, the main duty of actuating the operating rod is relieved by the power actuator, for the reason that when the double acting valve 248 is thus actuated, the valve 138 thereof closes the valve seat 139, and thereby closes communication between the air cleaner 246 and a cavity 258 in the relay valve 189, between the cap 226 and the diaphragm 225 thereof, and opens the valve seat 244 for connecting said cavity with the conduit 253 for exhausting air from the cavity 258, and thereby raising the diaphragm 225 and unseating the valve 230 and closing the valve 229 and opening the port 191 in the power actuator to atmosphere through the cleaner 235, the pipe 234, the passage 233, the cavity 218, the valve seat 221, the passages 219, 222, the port 223, the conduit 190 and the port 191, for collapsing the balanced condition of the piston 167 and causing actuation of said piston by the force of the vacuum received through the conduit 176 and actuating the lever 153, having operative connection with the operating rod 77 for power actuation of the latter. If, however, this power actuation should for any reason fail, the manual operation of said operating rod is still effective.

Unbalanced condition of the piston in the power actuator may also be obtained by means of a hand valve 261, for hand control of power actuation of the brakes independent of the pedal. The hand valve comprises a casing 262, having a valve seat 263, in which there is a valve plug 264, arranged to be operated by a handle 265 on the valve stem 266, the valve being held to its seat by a suitable gland 267 threaded to the valve casing and compressing a suitable spring 268 between said gland and the plug. The valve casing is provided with a port 269 and a port 270. A conduit 271 connects the port 269 with the vacuum conduit 176 by a joint 272, and a conduit 273 connects the port 270 with the port 212 of the relay valve 187. The valve plug has a passage 274 therein, communicating with the ports 269, 270 during hand control, one end thereof being seated against the wall of the valve seat 263 when the valve is closed, in order to close passage through the conduits 271, 273. When the hand valve is opened, the passage in its plug connects the ports 269, 270 and opens vacuum communication between the manifold 179 and the port 212 of the relay valve 187 acting on the diaphragm 203 thereof to open the valve seat 199 and close the valve seat 198, and admitting air through the air cleaner 209, the valve seat 199 in the relay valve 187, the valve seat 220 in the relay valve 189, and the conduit 190 communicating with the port 191 of the power actuator for collapsing the balanced condition of the piston therein and causing operation of the piston by vacuum through the port 177 and thereby operating the lever 153 for operating the operating rod 77 by power.

In the present exemplification of my invention, the brakes are hydraulic brakes. In such mechanism it is important that an ample amount of liquid be maintained in the braking system, and that no air or other gas be admitted into the system, so that the moving force of the liquid be at all times effective in brake application, in each braking system. It is also important that no severance or leakage take place in either or any braking system which would decrease the amount of braking liquid or the solidity of the same. These objectives are accomplished in my improved device, and in it the braking system for the towing vehicle and the braking system for the towed vehicle are separated from each other so as to maintain the full amount of braking liquid in each and to avoid the transference of braking liquid from one to the other.

I provide brake operating connecting mechanism between the towing vehicle and the towed vehicle for operating the brake operating means on the towed vehicle by brake actuating means on the towing vehicle, and provide separate fluid devices for said brake operating connecting mechanism separated from the fluid brake operating means on the towing vehicle and the fluid brake operating means on the towed vehicle, if such brake operating means be fluid actuated, so that each of the latter remains intact upon separation between the towing vehicle and the towed vehicle, whether such separation be intentional as by interchange between towing and towed vehicles, or be accidental, as in the case of a breakaway between said vehicles.

The brake operating connecting mechanism between the towing vehicle and the towed vehicle comprises a movable member on the towed vehicle for brake actuation on the towed vehicle, and a connection between a brake actuating part on the towed vehicle and the towing vehicle, so constructed that when a breakaway between the towed vehicle and the towing vehicle takes place, the brakes on the towed vehicle are applied by said connection. This connection may be a partable connection, and if partable, brake application on the towed vehicle takes place prior to such parting. Said connection is normally idle, the hitch between the vehicles forming the travel connection between the vehicles. When such hitch becomes ineffective the brake applying connection becomes effective to apply the brakes on the towed vehicle for such emergency.

The brake operating connecting mechanism (Figs. 1, 4, 5 and 9) comprises the fluid operating unit 46 on the towing vehicle and a fluid actuated unit 281 on the towed vehicle, these units having the conduit 42, as a flexible hose, between them, the conduit extending between the vehicles. The fluid actuated unit, which may also be termed a transfer cylinder unit, comprises a cylinder 282 and a piston 283 therein which is provided with a seat 284 for one end of a rod 285. A plug 286 is threaded in one end of the cylinder and has a port 287 therein, to which the delivering end of the conduit 42 is suitably secured to communicate with the interior of the cylinder. A cup washer 288 coacts with the piston, a spring 289 between the cup washer and the plug urging the piston outwardly toward the rod 285. A limiting ring 290 held in a rabbet 291 in said end by a spring ring 292, holds the piston in the cylinder.

A fluid operating unit 295 is provided on the towed vehicle and is actuated by the fluid actuated unit 281. (Figs. 1, 4 and 9.) This fluid operating unit is exemplified as a so-called master cylinder, and is similar to the fluid operating units or master cylinders 45, 46 on the towing vehicle, its respective parts being designated by similar reference numerals raised to the series
600. It is normally operated by the fluid actuated unit 281, by having the rod 285 thereof coact with the piston 654, the end of the rod being seated in the recess 691 in said piston.

The conduit 39 for the brake mechanism on the towed vehicle is suitably connected with the plug 664 for communicating with the inside of the cylinder 653. The fluid operating unit 295 and the fluid actuated unit 281 as shown form part of the breakaway mechanism 44.
The breakaway mechanism preferably includes means whereby to maintain the brakes on the towed vehicle applied after application thereof by a breakaway, and means are also provided for reassuming control of the braking mechanism on the towed vehicle after a breakaway. Means are further provided for intentional separation between the braking mechanism on the towing vehicle and the braking mechanism on the towed vehicle, and to establish such connection between different towing vehicles and towed vehicles; and means are also provided whereby the brake operating connecting mechanism may be separated from the towed vehicle and connected with a compensating means for the brake mechanism on the towing vehicle, so as to maintain normal fluid pressure in the latter, in order that the operation of the braking mechanism for the towing vehicle may not be substantially interfered with upon such separation; and means are further provided for independent actuation of the braking mechanism on the towed vehicle after accidental or intentional separation between the towed vehicle and the towing vehicle.

In a breakaway of the towed vehicle, excess strain is placed upon the conduit 42, and the conduit connection between the towing vehicle and the towed vehicle is severed in the exemplification of the invention shown in Figs. 1 to 11 inclusive. This conduit connection which may be a flexible hose, in the preferred form of the invention herein exemplified, serves as a fluid passage connection for the brake applying fluid between the towed vehicle and the towing vehicle, for normal brake operation from the towed vehicle, and also as a tension connection between the vehicles to operate the brake operating means on the towed vehicle upon a breakaway between the vehicles prior to parting of said tension connection.

In the present exemplification there is a slide 296, shown substantially U-shaped in cross section. (Figs. 9, 10 and 11.) The fluid actuated unit 281 is secured to the slide by means of pins 297 in mating holes 298 in the side walls 299 of the slide and holes 300 in lugs 301 of the cylinder 282. These pins are connected by a handle 302 rigid therewith for combined movements of the pins when connecting the actuated unit 281 with the slide or disassociating it therefrom. Cotter pins 303 in the pins 297 normally hold the pins in the holes.

The fluid operating unit 295 is also secured to the slide, as by means of bolts 304, passing through holes 305 in one of the side walls of the slide and into threaded holes 306 in lugs 307 of the cylinder 653. The lugs on the cylinders 282 and 653 are positioned laterally between the side walls of the slide so as to position the axes of said cylinders in alignment. The rod 285 is operatively located between the pistons in said cylinders in alinement therewith.

The slide 296 is slidable lengthwise in a guide 311, secured to the frame of the towed vehicle, as by being located between bars 312, 313 of said frame. Studs 314 pass through said bars and through aligned holes 315, 316 in lugs 317, 318 extending from the side walls 319, 320 of the guide, sleeves 321, 322 being located between said lugs and said bars for laterally positioning the guide, and nuts 323, 324 being threaded over the threaded ends of the studs for clamping the parts together and rigidly positioning the guide. The slide is provided with extensions 327, 328 at its respective ends, the studs being located above said extensions for holding the slide downwardly in the guide and permitting endwise movement of the slide in the guide, such endwise movement being limited by contact of the respective ends 329, 330 of the side walls of the slide with said studs.

The side flanges of the guide 311 are extended upwardly as lugs 331 at a point intermediate of their ends to provide bearings 332, 333 for a cross-shaft 334. Cams 335 are secured to the cross-shaft, as by pins 336 held in suitable mating holes in said cams and in the cross-shaft. Spacing collars 337 are located between said cams and the side walls of the guide. These cams have cam faces 338 arranged to engage the slide for holding the slide in actuated position. The coacting faces on the cams and slide are preferably so constructed as to lock the slide in actuated position on a breakaway to maintain the parts in actuated relation. An arm 341 is fixed to the cross-shaft 334. A spring 342 having connections 339, 340 at its respective ends with this arm and the guide, normally urges the cam into cam engaging relation with the slide. The cam shaft 334 is arranged to coact with the rod 285 when the slide is in abnormal position, and is shown received through a slot 343 in an enlargement 344 of the rod. (Figs. 9 and 11.) The rod is normally moved endwise in brake releasing direction by the spring 672 in the cylinder 653, in which relation the end wall 345 of the slot engages the cross-shaft for idle relation of the parts.

When the brakes on the towed vehicle are applied normally, the piston 283 is moved toward the outer end of the cylinder 282 for moving the rod endwise, with the walls of the slot therein moving with relation to the cross-shaft, the cross-shaft and the cams thereon remaining stationary during normal operation of the device, and the slide 296 being moved endwise by the spring 672 coacting with the cross-shaft 334, for contact of the shoulder 329 on the slide with the stud 314 adjacent thereto. Such movement may be amplified by a spring 346, one end of which is attached to a pin 347 secured to the slide and passing through a slot 348 in the guide, the other end of the spring being attached to a pin 349 on the guide.

Upon accidental parting between the towed vehicle and the towing vehicle, as upon a breakaway, tension is exerted upon the conduit 42, pulling upon the same, and by means of its connection with the fluid actuated unit 281, this unit, the slide 296 to which it is attached, and the fluid operating unit 295 also attached to the slide, are pulled endwise, whilst the rod 285 is held stationary with relation to the towed vehicle by reason of contact of the end wall 345 of its slot 343 with the cross-shaft 334, in the present exemplification, so that there is endwise movement of the cylinder 653 of the fluid operating unit, whilst the rod 285 is held endwise stationary with the towed vehicle, thereby acting to apply the brakes on the towed vehicle, there being movement of the cylinder 653 with relation to the piston 654 in such emergency brake application, as distinguished from movement of the piston with relation to the cylinder in normal brake application. Movement in brake applying direction of either the cylinder or the piston may take place to obtain emergency brake application within the spirit of the accompanying claims. Upon excessive pulling strain upon the conduit 42, the conduit connection will naturally part, but the pulling strain thereon upon the brake applying mechanism on the towed vehicle will before such parting have been sufficient to apply the brakes on the towed vehicle. Such pulling action upon the cylinder 282 has also moved the slide 296 lengthwise in its guide, whereby the bottom of the slide is moved under the cams, which prevent retraction of the slide and maintain the brake applying means in brake applying position. After such full emergency brake application there is preferably still some of the space 350 left between the shoulder 330 on the slide and the stud 314 adjacent thereto to insure such full emergency brake application.

The tension connection 42 between the towing vehicle and the towed vehicle parts upon further separation between the vehicles after full brake application of the towed vehicle, and the holding mechanism, instanced as the cams, holds the brake applying means in brake applying position until the parts are again intentionally unlocked. The towed vehicle is therefore immediately stopped upon a breakaway, so as to avoid accident, and the stopping of the towed vehicle continues until intentional or manual control thereover is again assumed.

The manual control is exemplified as a lever 353, (Figs. 1, 4 and 9), pivoted on a pin 354, located in bearings 355 of a fork 356, fixed to the frame of the towing vehicle, as on a cross-piece 357 thereof. The lever is provided with a handle 358. A supplemental lever 360 is pivoted on the main lever 353 by a pivot 361, and has a handle 362 thereon, normally spaced from but in adjacency to the handle 358. A flexible connection 363, as a cable, has one end thereof secured to a lug 364 on the lever 360, and passes about the pivot pin 354, and is connected with the outer end of the operating arm 341 of the cam shaft 334, preferably through the intervention of a spring 365, the respective ends of which are secured respectively to said operating arm 341 and to said flexible connection 363. The lever 353 is operatively connected with the slide, as by a flexible connection 366, which may be a cable, the respective ends of which are secured to said lever and to said slide, for instance, as shown respectively at 367 and 368.

The spring 342 extending from the operating arm 341 at one side thereof to normally hold the cams in operative contact with the slide, is a spring of sufficient capacity to urge the cams into engagement with the slide and to insure such engagement and cam action when the slide has been pulled lengthwise by a breakaway and to prevent retraction of said slide until the cam has been intentionally or manually released. Such release is effected by grasping the handles 358, 362, and urging the handle 362 toward the handle 358 on the pivot of the former, and thereby pulling upon the flexible connection 363 for pulling upon the operating arm 341 in release direction, cushioned by the spring 365, when the latter is employed, and thereby placing the slide 296 under control of the lever 353 for manipulating the braking mechanism on the towed vehicle independently of any connection there might have been with the braking mechanism on the towing vehicle and constituting an independent brake actuating means on the towed vehicle. Such independent brake control of the towed vehicle is also effective upon the braking mechanism of the towed vehicle through-out usual manipulations of the towed vehicle, for instance, in loading and unloading the same, in connecting the same with its selected towing vehicle and other manipulations of the towed vehicle which may be desired for usual operations thereof. Such manual manipulations are also effective after a breakaway for intentional movement of the towed vehicle or its reconnection with a towing vehicle. Such operations are very frequent and take place at each loading and unloading of the towed vehicle, so that such manual control is under continual test to insure that the breakaway emergency control of the brakes is continuously effective.

The spring 365 is preferably a stronger spring and is capable of exerting more force than the spring 342, and is subordinate in movement to the spring 342 throughout the range of emergency cam application by the latter, by reason of having more idle space in its connection with the operating lever 353 than is in the connection of the springs 342 with the guide 311. The spring 365 becomes preponderant over the spring 342 during service manipulation of the brakes on the towed vehicle by the lever 353, in that it yields to manual strains on the flexible connection 363 to permit controlled movements of the handle with relation to the handle 358 and desired movement of the lever 353 on its pivot 354. When such service manipulation has been completed, the handle 362 is released for placing the lever 341 under control of the spring 342 for engaging the cams 335 with the slide, to hold the slide in manipulated position for brake application.

It is often desirable to operate the towing vehicle with no towed vehicle attached, and I have provided means whereby this may be done with the brake applying means on the towing vehicle maintained in operative condition equal to its operative condition when a towed vehicle is attached. In brake applying means employing a fluid for brake operation, on the towing vehicle, it is desirable that the resistance of the fluid shall be substantially equal, whether or not a towed vehicle is attached to the towing vehicle, and I have therefore provided means whereby there may be separation between the towed vehicle and the towing vehicle and the brake operating means between the same, and reacting means provided for the brake applying means on the towing vehicle in substitution for the brake applying means on the towed vehicle in order that the brake applying means on the towing vehicle may continue their duties of brake application in the same manner after the towed vehicle is removed.

In the present exemplification the fluid in that portion of the braking mechanism between the towing vehicle and the towed vehicle acts on the piston 283 in the fluid actuated unit with which the connecting conduit 42 has fluid connection (Figs. 1, 3, 9 and 10.) This piston is provided with the socket 284, in which the operating end of the actuating rod 285 is normally located. This fluid actuated unit may be removed from the towed vehicle and mounted on the towing vehicle in association with a cushioning reacting device 370 on the towing vehicle, when it is desired to disconnect the towing vehicle from the towed vehicle, and the brakes on the towed vehicle applied by the lever 353.

The cushioning reacting device exemplified comprises a supporting plate 371 on the towing vehicle having a guide 372 secured thereto by bolts and nuts 373. This guide is provided with a channel 374 having side walls 375 and an end lug 376, which has a bearing 377. An adjusting rod 378 is reciprocable endwise in this bearing. This rod is screw threaded and has an adjusting nut 379 and a jam nut 380 threaded thereon. The outer end of the threaded rod has a limiting shoulder 381 secured thereto, being shown as a nut threaded over the rod and secured to the rod by a pin 382. A spiral spring 383 is located about the rod and is centered with relation to the rod and spaced therefrom by having its respective ends located about spacing bosses 384, 385 respectively on said lug and a washer 386. The inner end of the rod has an end formation 387, about which the wall of the socket 284 is located when the fluid actuated unit 281 is secured to the towing vehicle.

This fluid actuated unit is arranged to be moved bodily from the towed vehicle to the towing vehicle by removing the pins 297 by pulling on the handle 302 for releasing the same from the towed vehicle and placing it on the towing vehicle in operative relation with the rod 378, as by locating its lower portion with its lugs 301 in the channel 374, with the holes 300 therein registering with companion holes 388 in the respective side walls 375, and inserting the pins 297 in said mating holes by pushing on its handle 302 and reinserting the cotter pins 303, for connecting the cylinder of the fluid actuated unit with the towing vehicle, the conduit 42 retaining its connection with said cylinder for operating the piston 283 when the brakes on the towing vehicle are applied by means of the equalizing device 51. This application of the brakes causes endwise movement of the piston 283, thereby actuating the rod 378, resisted by the spring 383, in simulation of the resistance by the braking mechanism on the towed vehicle when such fluid actuated unit is normally connected with the towed vehicle. Such resistance by the spring 383 is adjustable by adjusting the adjusting nut 379 and its jam nut 380. The brakes on the towing vehicle may now be applied with the full assurance that the brake application shall be the same on the towing vehicle as when the towed vehicle was attached thereto. The resistance of this substitute device substantially equals the normal resistance of the braking mechanism on the towed vehicle for which it has been substituted.

If it is desired to re-connect a towed vehicle with the towing vehicle, the brake mechanisms between the two are readily re-connected by removing the fluid actuated unit from the towing vehicle and re-locating it on the towed vehicle, by the simple operation in the present exemplification of removing the pins 297 from the towing vehicle, changing the fluid actuated unit from its channel on the towing vehicle to its slide on the towed vehicle, and reinserting the pins through the mating holes 298, 300, with the end of the operating rod 285 located in the socket 284 of the piston 283.

In the present exemplification the fluid operating units 45, 46 retain their connections with the operating means on the towing vehicle, and the latter retain their equalizing connections with said fluid operating units regardless of whether the fluid actuated unit connected with one of said fluid operating units is operatively connected with the fluid operating unit on the towed vehicle for operating the brake applying mechanism on the towed vehicle or with the cushioning reacting device 370 mounted on the towing vehicle.

The fluid conduit and tension connections between the vehicles are in Figs. 1 to 11 inclusive shown as a composite structure, namely, the hose 42, which serves as the conduit between the fluid operating unit 46 on the towing vehicle and the fluid actuated unit 281 on the towed vehicle, for normal brake application on the towed vehicle, and has a tension connection by its physical structure between the towing vehicle and a member of the brake operating means on the towed vehicle for emergency application of brakes on the latter on a breakaway between the vehicles.

In Figs. 12 and 13 the fluid conduit and tension connections are shown as separate structures, the fluid conduit connection being shown as a hose 391, and the tension connection being shown as a cable 392. The hose 391 has fluid connection at its respective ends respectively with the cylinder of the fluid operating unit 46 on the towing vehicle and with the cylinder of the fluid actuated unit 281 on the towed vehicle. The tension connection 392 has a connection 393 with the towing vehicle at one of its ends, and a connection 394 with a brake operating member of the brake operating means on the towed vehicle at the other of its ends, this latter connection being shown as a ring on the plug 286 of the fluid actuated unit 281, whereby, upon a breakaway, the cylinder 653 of the fluid operating unit 295 is moved endwise with relation to its piston 654, which is held against endwise movement in the same direction by the rod 285 and its contact connection with the cross rod 334.

The hitch 396 between the towing vehicle and the towed vehicle is usually deranged or broken upon such breakaway, whereby separation takes place between the towing vehicle and the towed vehicle. Such separation causes a tension strain on the tension connection, whether such tension connection be a separate member, as shown by the cable 392, or be the conduit hose 42, between the towing vehicle and the towed vehicle, for causing movement of the movable member for brake application on the towed vehicle, to thereby automatically apply the brakes on the towed vehicle, effecting an emergency brake application on the towed vehicle. The tension connection between the towing vehicle and the towed vehicle is severed upon excess strain being applied thereto by such separation between the vehicles or by increase in such separation, but the emergency brake application on the towed vehicle will already have taken place prior to such severing.

The tension connection between the towing vehicle and the towed vehicle, whether it be a separate connection or the fluid conducting tube, is preferably weaker than the hitch between said vehicles and is sufficiently long to avoid tension action thereon until a breakaway occurs. The fluid conduit connection and the tension connection are preferably effectively longer than said hitch, so that, while the hitch connects the vehicles, said connections are unstrained between the vehicles. The tension connection becomes effective for pulling connection between the vehicles upon failure of the hitch between the vehicles, to make emergency brake application on the towed vehicle upon undue separation between the vehicles. Such greater lengths of such conduit and tension connections also insures that emergency brake application on the towed vehicle is avoided until a failure of the hitch occurs. It is also preferred that when a separte tension connection 392 is employed, the conduit connection 391 is effectively longer than the tension connection to insure that emergency brake application on the towed vehicle takes place prior to severance in the conduit connection 391 upon breakaway between the vehicles. Said connections are preferably of such length that their normal functions will not be disturbed by limited movements between the vehicles, such as take place in travel, whether straightaway or turning, in placing the respective vehicles, or in loading or unloading the same.

The brake applying means for the towing vehicle remain effective for applying the brakes on the towing vehicle upon a breakaway between the vehicles, due to the segregation between the fluid conduits respectively on the towing vehicle and on the towed vehicle, and to the limiting of the pivotal movement permitted the bar 85 on the operating rod 77.

When it is desired to apply the brakes under normal conditions, the operator on the towing vehicle presses on the pedal 131, which has mechanical connections comprising the rod 134, the control valve 137, the operating rod 77, and the cross-bar 85, with the fluid operating units 45, 46, amplified by the connection of the power actuator 165 with the operating rod 77, to operate the movable members of said respective fluid operating units or brake appliers, in order to separately apply the brakes on the towing vehicle through the conduit 41 and on the towed vehicle through the conduit 42. The fluid operating unit 46 on the towing vehicle connects with a fluid actuated unit 281 normally located on the towed vehicle, to actuate a movable member of a fluid operating unit or brake applier 295 on the towed vehicle, by means of the rod or operative member 285 for normal brake application on the towed vehicle.

The brake mechanisms respectively on the towing vehicle and on the towed vehicle are each self-contained and independent of each other for brake application, and each of the same comprises an actuated member for effecting brake application, the actuated member on the towing vehicle being exemplified as the piston rod 87, and the brake applying member on the towed vehicle being exemplified as the operating rod 285. The fluid operating unit 46, the conduit 42 and the fluid actuated unit 281 form the brake operating connecting mechanism between the towing vehicle and the towed vehicle, which is normally operated on the towed vehicle and exerts its operating influence on the brake mechanism of the towed vehicle, so that the brakes on the towed vehicle are applied substantially simultaneously with the brake application on the towing vehicle. This brake operating connecting mechanism may be entirely separate or removed, with the brake mechanism on the towing vehicle and the brake mechanism on the towed vehicle respectively remaining intact, for independent brake application on the towing vehicle and on the towed vehicle.

The interconnecting mechanism between the towing vehicle and the towed vehicle comprises means acting upon a breakaway between the towing vehicle and the towed vehicle, for emergency brake application on the towed vehicle, and means for maintaining brake application on the towed vehicle until manual or intentional control of such brake mechanism on the towed vehicle is again assumed. Upon a breakaway the towed vehicle thus has its brakes applied thereon, and the brakes on the towing vehicle are still under control of the driver on the towing vehicle, immediately in advance of the towed vehicle, which has broken away, or on some connected vehicle in advance thereof, it being assumed that the term towing applies to an advance vehicle in a train of vehicles, and the term towed applies to one of the vehicles in rear thereof.

When now a breakaway occurs there is immediate emergency brake application on the towed vehicle, and the towed vehicle or vehicles are immediately stopped, it being assumed that if there be more than two towed vehicles in the train, that each advance vehicle and the following vehicle next thereto have the brake operating connecting mechanism located therebetween for emergency brake application if there should be an accidental parting between said succeeding vehicles.

Such emergency brake application is caused by the pulling action between the vehicles to operate one of the movable members of the brake mechanism on the towed vehicle for emergency brake application. This movement is instanced as taking place between the rod 285 operating the piston 654 and the cylinder 653 in which the same operates. In the present exemplification the rod 285 is the movable member for normal brake application, and the cylinder 653 is the movable member for emergency brake application, although it will be readily understood that there may be a transposition between these parts and movements, or that either one of these members may be the moving member in normal brake application or in emergency brake application, or that any other movable member may be employed for emergency brake application on the towed vehicle, within the scope of my invention, as stated in the accompanying claims.

Upon accidental separation between a towing vehicle and the towed vehicle, tension is applied to a connecting member between the vehicles, instanced as the conduit 42 in the exemplification shown in Figs. 1 to 11 inclusive, and as a separate tension connection 392, instanced as a cable, in Figs. 12 and 13, whereby the movable member of the brake mechanism on the towed vehicle is moved for emergency application of the brakes, and holding means are also provided, exemplified as the cams 335 for holding the movable member in moved position in order to insure continuance of brake application on the towed vehicle until intentional control is again taken of the brake mechanism on the towed vehicle, as by means of the operating lever 353, and the supplemental lever 360, the latter instanced as controlling the cam or holding member, and the former instanced as controlling the brake application.

Accidental separation between the towing vehicle and the towed vehicle takes place by failure of the driving connection between them, for instance, of the hitch 396. Immediately upon such failure, emergency brake application of the brakes on the towed vehicle takes place, and on further separation between the vehicles upon the breakaway, parting between the connecting member of the emergency brake applying mechanism operatively disposed between the vehicles, between the movable emergency brake applying member on the towed vehicle and the towing vehicle takes place, but the braking mechanism on the towed vehicle has already been applied, and such brakes are held or locked in brake applied position by the holding or locking means before such parting occurs.

The manual control for the emergency brake application on the towed vehicle is subjected to continual tests, because it is also employed for normal brake application on the towed vehicle, as when connecting the vehicles in a train, when placing the towed vehicle for parking, when reassuming control of the towed vehicle upon a breakaway, and when loading the towed vehicle, whether the towed vehicle be connected or not with a towing vehicle, as it has been found advisable to apply the brakes on the towed vehicle by the separate control therefor when loading, so that its position on the ground is fixed.

The fluid operating units 45, 46 are preferably of equal brake applying capacity when the brake applying members thereof are equally operated. It occurs in practice, however, in assembling different towing vehicles and towed vehicles, that the applied forces on the brakes on the vehicles respectively differ for equal brake application. To equalize such differences I have provided the relative adjustment between the operating rod 77 and the movable members of the respective fluid operating units 45, 46, as by adjusting the distances between the pivot connections 89, 90 and the pivot connection 86, so as to adjust the length of the arms of the cross bar 85 at the respective sides of its pivot 86, in order to adjust the leverage obtained thereby and apply more or less force to one of the fluid operating units 45, 46 than to the other for obtaining equal forces of brake applications respectively on the towing vehicle and on the towed vehicle.

While I have exemplified hydraulic brake mechanisms respectively on the towing vehicle and on the towed vehicle, it is obvious that other forms of brake mechanism, for instance, mechanical brake mechanism, may be selectively employed thereon respectively, and that an actuated part of the brake applying means respectively for the brake mechanism on the towing vehicle and on the towed vehicle other than that herein exemplified may coact with an operating member of each such other brake mechanisms; that, further, a different character of connecting means between the towing vehicle and the towed vehicle than the flexible connections, represented by the hose and the cable and their connections, may be employed as the tension, pulling or actuating member between the towing vehicle and the towed vehicle for emergency brake application upon a breakaway; that, further, a different form of holding means, clamp or lock to hold the parts in emergency brake condition than that herein exemplified, may be employed; that the power means or medium for actuations of the brake mechanisms and the brake operating connecting mechanisms and the controls therefor, respectively, may be compressed air or fluid other than that herein particularly mentioned; and that other changes in structures and arrangements from what is herein shown and described may be made without departing from the spirit and scope of my invention set forth in the accompanying claims.

Having thus fully described my invention, what I claim as new and desire to secure by Letters Patent, is:

1. In braking mechanism between a towing vehicle and a towed vehicle provided with brake mechanism, the combination of a hydraulic operating unit, a hydraulic operated unit for brake application on the towed vehicle, and hydraulic passage and tension connections between said vehicles severable upon separation between said vehicles and constructed respectively for operation of said brake mechanism on the towed vehicle, the former by connection with said hydraulic units and by the hydraulic medium in said units and in said hydraulic passage for normal brake application of said brake mechanism on the towed vehicle and the latter by having connection with said hydraulic operated unit for emergency brake application of said brake mechanism on the towed vehicle.

2. In braking mechanism between a towing vehicle and a towed vehicle provided with brake mechanism, the combination of a hydraulic operating unit for mounting on the towing vehicle, a hydraulic operated unit for brake application on the towed vehicle, and a hydraulic conduit between said units for the hydraulic medium of said units for normal brake application of said brake mechanism of the towed vehicle, and said hydraulic conduit being connected with said hydraulic operated unit for emergency brake application of said brake mechanism on the towed vehicle induced by tension of said hydraulic conduit upon a breakaway between said vehicles.

3. In braking mechanism between a towing vehicle and a towed vehicle provided with brake mechanism, the combination of a hydraulic operating unit, a hydraulic operated unit for brake application on the towed vehicle, and hydraulic passage and tension connections between said vehicles severable by separation between said vehicles, said hydraulic passage connection connecting said units for normal hydraulic operation of said hydraulic operated unit for normal operation of said brake mechanism of said towed vehicle, and said tension connection having operative connection with said hydraulic operated unit for emergency operation of said brake mechanism of the towed vehicle upon separation between said vehicles.

4. In braking mechanism between a towing vehicle and a towed vehicle provided with brake mechanism, a fluid operating unit on the towing vehicle, a fluid operated unit for brake application on the towed vehicle comprising a fluid actuated member and a tension actuated member, and fluid passage and tension connections between said vehicles respectively having passage connection with said fluid actuated member to transmit fluid communication between said units for fluid actuation of said fluid actuated member for normal operation of said brake mechanism and operative connection with said tension actuated member for operation of said brake mechanism by tension upon a breakaway between said vehicles.

5. In braking mechanism between a towing vehicle and a towed vehicle provided with brake mechanism, a fluid operating unit for mounting on the towing vehicle, a fluid operated unit for brake application on the towed vehicle comprising a pair of oppositely movable members for brake application, and fluid passage and tension connections between said units respectively to transmit fluid in said fluid passage connection between said units to actuate one of said movable members for normal brake application of said brake mechanism on the towed vehicle and said tension connection constructed for operation of the other of said movable members upon a breakaway between said vehicles for emergency brake application of said brake mechanism on the towed vehicle.

6. In brake connecting means between a towing vehicle and a towed vehicle, a fluid operating unit for the towing vehicle, a fluid operated unit for the towed vehicle constructed for normal fluid actuation and for emergency mechanical actuation, in order to accordingly operate the brake mechanism on the towed vehicle, and a fluid conduit between said units for such normal fluid actuation and having tension applied thereto by separation between said vehicles for such emergency mechanical actuation.

7. In braking mechanism, a master fluid pressure unit for attachment to a towing vehicle, a fluid transfer actuator having fluid passage connection with said unit, a second master fluid pressure unit comprising a normally actuated part with which said fluid transfer actuator has operative connection for normal actuation of the same to obtain normal brake application on a towed vehicle and a normally stationary member having tension connection with the towing vehicle for moving said normally stationary member relatively to said normally actuated part by the tension of said tension connection upon a breakaway between said vehicles for emergency brake application on the towed vehicle.

8. In braking mechanism between towing and towed vehicles for applying the brakes on the towed vehicle, an operating part for normal brake application normally operable from the towing vehicle, a stop for limiting retraction of said operating part, a brake actuator comprising a movable normal brake applying element retractingly held by said stop and a coacting normally stationary element movable for emergency brake actuation, and a partable connection between said towing vehicle and said normally stationary element for movement thereof for emergency brake application upon a breakaway between said towing and towed vehicles.

9. In braking mechanism between towing and towed vehicles for applying the brakes on the towed vehicle, an operating part for normal brake application normally operable from the towing vehicle, a stop for limiting retraction of said operating part, a brake actuator comprising a movable normal brake applying element retractingly held by said stop and a coacting normally stationary element movable for emergency brake actuation, a partable connection between said towing vehicle and said normally stationary element for movement thereof for emergency brake application upon a breakaway between said towing and towed vehicles, and holding means for said normally stationary element to hold the same in moved position to maintain emergency brake application.

10. In braking mechanism between towing and towed vehicles for applying the brakes on the towed vehicle, an operating part for normal brake application normally operable from the towing vehicle, a stop for limiting retraction of said operating part, a brake actuator comprising a movable normal brake applying element retractingly held by said stop and a coacting normally stationary element movable for emergency brake actuation, a partable connection between said towing vehicle and said normally stationary element for movement thereof for emergency brake application upon a breakaway between said towing and towed vehicles, holding means for said normally stationary element to hold the same in moved position to maintain emergency brake application, and manual means to control said holding means and operate said normally stationary element to reassume control of brake application.

11. In braking mechanism between towing and towed vehicles, the combination of brake applying means for the brakes on the towed vehicle, an operating part therefor having connection with the towing vehicle and normally operable therefrom, movement limiting means for said operating part, and mounting means for said brake applying means having operative connection with the towing vehicle to move said brake applying means with relation to said limited movement of said operating part whereby to apply the brakes on the towed vehicle.

12. In braking mechanism between a towing vehicle and a towed vehicle, the combination of a fluid actuating unit for brake application on the towed vehicle comprising a pair of members one of which is normally stationary and the other of which is normally movable in a given direction for normal brake application, a stop to limit the retraction of said normally movable member, a partable connection between said normally stationary member and the towing vehicle whereby to actuate said normally stationary member in such retracting direction for emergency brake application at a breakaway, and holding means to hold said normally stationary member in actuated position.

13. In braking mechanism between a towing vehicle and a towed vehicle, the combination of a fluid transfer unit and a fluid actuating unit for brake application on the towed vehicle comprising normally stationary cylinders and normally movable pistons, an actuating member between said pistons normally movable in a given direction for normal brake application, a stop to limit the retraction of said actuating member, a partable connection between said cylinders and the towing vehicle whereby to actuate said cylinders in such retracting direction for emergency brake application at a breakaway, and holding means to hold said cylinders in actuated positions.

14. In braking mechanism, the combination of a guide and a slide therefor, constituting a pair of relatively movable members, a transfer unit and an operating unit each comprising a pair of relatively movable elements, one element of each of said pairs of elements held to one of said pair of members and the other element of each of said pairs of elements movable with relation thereto, and a connecting member between the latter for normal brake application, a stop for the latter held to the other of said pair of members, and means to move said one of said pair of members for brake application.

15. In braking mechanism, the combination of a guide and a slide therefor, constituting a pair of relatively movable members, a transfer unit and an operating unit each comprising a pair of relatively movable elements, one element of each of said pairs of elements held to one of said pair of members and the other element of each of said pairs of elements movable with relation thereto, and a connecting member between the latter for normal brake application, a stop for the latter held to the other of said pair of members, means to automatically move said one of said pair of members for brake application upon a breakaway, and automatic maintaining means for said one of said pair of members.

16. In braking mechanism between a towing vehicle and a towed vehicle, the combination of a guide, a slide therefor, an actuating unit for brake application on the towed vehicle comprising a normally stationary member on said slide and a normally movable member, operating means on the towing vehicle for said normally movable member for normal brake application on the towed vehicle, normally inactive connecting means between the towing vehicle and said slide for moving said slide for emergency brake application on the towed vehicle, holding means between said slide and said guide, spring means to normally hold said holding means in holding relation, and manually operated spring means to release said holding means.

17. In braking mechanism between a towing vehicle and a towed vehicle having a hitch therebetween, the combination of a fluid actuating unit on the towed vehicle for brake actuation on the latter including a normally stationary member and a normally movable member, and fluid and tension connections extending from the towing vehicle and having operative connections with said fluid actuating unit respectively for operating said normally movable member for normal brake application on said towed vehicle and for moving said normally stationary member at a breakaway for emergency brake application on said towed vehicle, said fluid actuating unit shiftable to said towing vehicle with said fluid and tension connections.

18. In braking mechanism between a towing vehicle and a towed vehicle, the combination of a guide, a slide therefor, a fluid transfer unit and a fluid actuating unit for brake application on the towed vehicle comprising normally stationary cylinders secured to said slide and normally movable pistons, an actuating member between said pistons normally movable in a given direction for normal brake application, a stop to limit retraction of said actuating member, and a connection between said slide and the towing vehicle whereby to actuate said slide in such retracting direction for emergency brake application at a breakaway.

19. In braking mechanism between a towing vehicle and a towed vehicle, the combination of a guide, a slide therefor, a fluid transfer unit and a fluid actuating unit for brake application on the towed vehicle comprising normally stationary cylinders secured to said slide and normally movable pistons, an actuating member between said pistons normally movable in a given direction for normal brake application, a stop to limit the retraction of said actuating member, a partable connection between said slide and the towing vehicle whereby to actuate said slide in such retracting direction for emergency brake application at a breakaway, and holding means to hold said slide in actuated position.

20. In braking mechanism between a towing vehicle and a towed vehicle, the combination of a guide, a slide therefor, a fluid transfer unit and a fluid actuating unit for brake application on the towed vehicle comprising normally stationary cylinders secured to said slide and normally movable pistons, an actuating member between said pistons normally movable in a given direction for normal brake application, a stop to limit the retraction of said actuating member, a partable connection between said slide and the towing vehicle whereby to actuate said slide in such retracting direction for emergency brake application at a breakaway, holding means to hold said slide in actuated position, and manual control means for said holding means and said slide for brake application on the towed vehicle.

21. In braking mechanism between a towing vehicle and a towed vehicle each of which has braking means and fluid brake applying means for the latter thereon, the brake applying forces in said respective brake applying means being related for related pressures in said respective braking means, the combination of a fluid transfer unit normally located on the towed vehicle and comprising a fluid actuated member having a normal movement and meeting a normal resistance in normal brake application on the towed vehicle, an actuating unit for the latter on the towing vehicle, fluid conduit connection between the latter and said fluid actuated member, and means on the towing vehicle to position said fluid transfer unit including a resiliently yieldable resistance device constructed for movement and resistance respectively similar to said normal movement and said normal resistance to cushioningly resist actuation of said fluid actuated member for maintaining the brake applying pressure in the fluid brake applying means on the towing vehicle.

22. In brake applying means for a plurality of brake mechanisms, a fluid operating unit for each of said brake mechanisms, each of said fluid operating units comprising an operating part, a common operating member for said operating parts, a cross bar having jointed connection with said operating member to form actuating arms extending from said operating member and for tilting movements of said cross bar on said operating member, means between said operating member and said cross bar to limit such tilting movements, said cross bar having jointed connections with said respective operating parts, and adjusting means to relatively adjust the distances between said jointed connections to vary the lengths of said actuating arms.

23. In brake applying means for a plurality of brake mechanisms, a fluid operating unit for each of said brake mechanisms, each of said fluid operating units comprising an operating part, a pair of supports, said fluid operating units mounted on one of said supports, a common operating member for said operating parts and operating means therefor on the other of said supports, a cross bar having jointed connections with said operating member and with each of said operating parts, adjusting means to relatively adjust the distances between said jointed connections, and means for relative adjustment between said supports to accommodate for adjustments of said last-named adjusting means.

24. In brake applying means for a plurality of brake mechanisms, a pair of supports, a fluid operating unit for each of said brake mechanisms mounted on one of said supports, each of said fluid operating units comprising an operating part, a manual operating member, a cross bar having jointed connections with said operating member and each of said operating parts, adjusting means to relatively adjust the distances between said jointed connections, a power actuator supported by the other of said supports, a lever pivoted to said other of said supports and having jointed connections with said manual operating member and said power actuator, and means for relative adjustment between said supports to accommodate for said adjustments between said jointed connections.

25. The combination with towing and towed trackless vehicles having a hitch therebetween, said towed vehicle provided with self-contained braking mechanism, of a movable brake applying member for said self-contained braking mechanism, an emergency brake applying connection between said movable brake applying member and the towing vehicle operable upon a breakaway to actuate said movable brake applying member for emergency brake application of said self-contained braking mechanism on said towed vehicle, and automatic holding means to automatically hold said movable brake applying member in actuated position.

26. The combination with towing and towed trackless vehicles having a hitch connection therebetween, said towed vehicle provided with self-contained braking mechanism, of brake applying means for said self-contained braking mechanism, said brake applying means comprising a plurality of members having relative movement between them for brake application on said towed vehicle, and passage and pull connections operatively connected with the towing vehicle, said passage connection having operative connection with a member of said plurality of members for normal brake applying movement between said members for normal brake application of said self-contained braking mechanism, and said pull connection having operative connection with a member of said plurality of members for emergency brake applying movement between said members for emergency brake application of said self-contained braking mechanism and operable upon a breakaway between said vehicles to apply the brakes on the towed vehicle.

27. The combination with towing and towed trackless vehicles having a hitch connection therebetween, said towed vehicle provided with self-contained braking mechanism, of brake applying means for said self-contained braking mechanism, said brake applying means comprising a plurality of members having relative movement between them for brake application on said towed vehicle, passage and pull connections operatively connected with the towing vehicle, said passage connection having operative connection with a member of said plurality of members for normal brake applying movement between said members for normal brake application of said self-contained braking mechanism, and said pull connection having operative connection with a member of said plurality of members for emergency brake applying movement between said members for emergency brake application of said self-contained braking mechanism and operable upon a breakaway between said vehicles to apply the brakes on the towed vehicle, and automatic holding means to hold said last-named member of said plurality of members in emergency brake applying relation.

28. The combination with towing and towed trackless vehicles having a hitch connection therebetween, said towed vehicle provided with self-contained braking mechanism, of brake applying means for said self-contained braking mechanism, said brake applying means comprising a plurality of members having relative movement between them for brake application on said towed vehicle, passage and pull connection operatively connected with the towing vehicle, said passage connection having operative connection with a member of said plurality of members for normal brake applying movement between said members for normal brake application of said self-contained braking mechanism, and said pull connection having operative connection with a member of said plurality of members for emergency brake applying movement between said members for emergency brake application of said self-contained braking mechanism and operable upon a breakaway between said vehicles to apply the brakes on the towed vehicle, and automatic holding means to hold said last-named member of said plurality of members in emergency brake applying relation, and said hitch connection and said pull connection being constructed to be partable in the order named upon a breakaway between said vehicles.

29. In braking mechanism between a towing vehicle and a towed vehicle provided with brake mechanism, the combination of a fluid operating unit for mounting on the towing vehicle, a fluid operated unit for brake application on the towed vehicle comprising a pair of members for brake application, and fluid passage and tension connections between said units respectively to transmit fluid in said fluid passage connection between said units to actuate one of said members of said fluid operated unit for normal brake application of said brake mechanism on the towed vehicle and said tension connection constructed for operation of one of said members of said fluid operated unit upon a breakaway between said vehicle for emergency brake application of said brake mechanism on the towed vehicle.

30. In braking mechanism between a towing vehicle and a towed vehicle provided with brake mechanism, the combination of a hydraulic operating unit, a hydraulic actuated unit for brake application on the towed vehicle, actuating and anchor members coacting with said brake mechanism on the towed vehicle, and hydraulic passage and tension connections between said vehicles, said hydraulic passage connection having operative connection with the said hydraulic actuated unit for actuation of said actuating member for normal brake application of said brake mechanism on the towed vehicle and said tension connection having coaction with said anchor member for emergency brake operation of said brake mechanism on the towed vehicle upon a breakaway between said vehicles.

WALTER E. PARKES.